Patented Apr. 20, 1954

2,676,171

UNITED STATES PATENT OFFICE 2,676,171

SULFUR DYE OF THE INDOPHENOL SERIES

Benjamin F. Skiles, Wilmington, Del., assignor to E. I. du Pont de Nemours and Company, Wilmington, Del., a corporation of Delaware No Drawing. Application April 18, 1950, Serial No. 156,731

4 Claims. (Cl. 260—134)

This invention relates to a new sulfur dye of the indophenol series, and more particularly to a sulfur color produced by thionation of a mixture of indophenols from diphenylamine and 4-sulfodiphenylamine which, in their reduced form, have the respective formula:

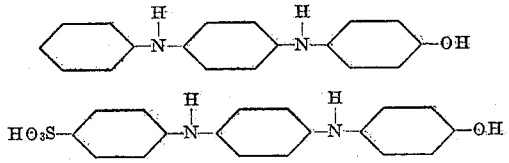

For many years there has been on the market a bright blue sulfur dye which is produced by condensing diphenylamine and para-nitrosophenol in a sulfuric acid solution to yield an indophenol which is then isolated and thionated with polysulfide. This color when reduced to its leuco form has such poor water solubility that it is not suitable for use in the dyeing of packages and beams where relatively concentrated solutions of the reduced dyes are required, for in this form of dyeing the solution of the dye is repeatedly pumped through tightly wound spools of yarn and the unsoluble materials filter out of the surfaces of the package, giving undesirable, uneven, specky dyeings. In an attempt to overcome this defect, a blue sulfur dye has been prepared by condensing sulfonated diphenylamine with para-nitrosophenol and thionating the resulting indophenol (see British Patent 7025/03). This dye, however, has limited utility because, due to its poor affinity for textile material, it exhausts poorly from the dye bath.

It is an object of the present invention to produce a sulfur dye of the indophenol series which dyes in a bright blue color, has good solubility in the reduced form and exhibits good fastness, brightness and exhausting properties, and one which is suitable for use in machine and package dyeing.

I have found that, if a mixture of indophenols produced from diphenylamine and from 4-sulfodiphenylamine is cothionated in the manner usually employed in the thionation of this type of indophenol compounds, a bright blue sulfur color is obtained having good solubility and excellent exhausting properties. While it would be expected that a mixture of the indophenol from diphenylamine and the indophenol from 4-sulfodiphenylamine when thionated would produce a sulfur dye which would have the properties of a mere mixture of the thionated indophenol from diphenylamine and the thionated indophenol from 4-sulfodiphenylamine, on testing the product which I obtain by my cothionation process I find that a new dye is obtained which not only exhausts far better than a comparable mixture of the dyestuffs but which exhausts from the dye bath equal to the dye prepared from the unsulfonated diphenylamine itself. It is therefore apparent that the cothionation of the mixture of indophenols does not produce a mere mixture of the sulfurized colors but instead produces a new sulfur color which apparently contains the radicals of both the diphenylamine and the sulfodiphenylamine in its molecule. This results in a dyestuff which has enhanced solubility due to the presence of the sulfo group in the molecule but which still has excellent exhausting properties in spite of the presence of the sulfo group or groups which, in the ordinary sulfur color of the indophenol produced from 4-sulfodiphenylamine, exhibits extremely poor exhausting properties.

The condensation of the diphenylamines with the paranitrosophenol and the thionation of the mixture of the indophenol from the diphenylamine and from the 4-sulfodiphenylamine may be carried out by the procedure generally described in the prior art—see, for instance, U. S. Patents 1,777,757, 1,944,250 and 2,165,493. The mixture of indophenols is conveniently produced by reacting para-nitrosophenol with a mixture of diphenylamine and sulfodiphenylamine, although a mixture of the separately prepared indophenols may also be employed. The new dye of this invention is produced by thionating a mixture preferably containing from 15% to 50% of a member of the group consisting of the indophenol and leucoindophenol from the 4-sulfodiphenylamine and from 85% to 50% of the member of the group consisting of the indophenol and leucoindophenol from diphenylamine.

The thionation is preferably carried out in a fusion of sodium sulfide and sulfur in an alcohol, and more particularly of an alcohol of the type described in U. S. Patent 1,944,250.

The following examples are given to illustrate the invention. The parts used are by weight unless otherwise specified.

*Example 1*

A stainless steel kettle is charged with 1800 pounds of "Cellosolve" (ethylene glycol monoethyl ether). Sodium sulfide crystals equivalent to 427 pounds of 100% sodium sulfide are added together with 1063 pounds of sulfur. The charge is heated at 105° C. until all of the sulfur is dissolved as sodium polysulfide. The charge is then cooled to 70° C. and there are added 389 pounds of diphenylamine leucoindophenol and 160 pounds of 4 - sulfodiphenylamine leucoindophenol in the form of approximately 25% aqueous press cakes. The charge is refluxed at 107°–110° C. for 72 hours. The charge is then cooled to 80° C., made alkaline to Clayton Yellow with caustic and enough water is added to give a total volume of 3000 gallons. The charge is blown with air at 65° C. to oxidize the leuco dyestuff, 2500 pounds of salt are added and the dye is filtered off and dried at 65° C. The dyestuff dyes cotton bright shades from a sodium sulfide vat. It exhausts well and when used in package dyeing gives clean uniform dyeings due to the excellent solubility of its vat.

*Example 2*

A flask equipped with a stirrer and a reflux condenser is charged with 74 grams of $Na_2S.9H_2O$, 59 grams of sulfur and 100 cc. of "Cellosolve." The charge is heated to reflux temperature for 20 minutes and cooled to 70° C. Diphenylamine leucoindophenol (12 grams) and 4-sulfodiphenylamine leucoindophenol (12 grams) are added as 22% aqueous pastes. The charge is refluxed at 107°–108° C. for 24 hours. Then there are added 35 cc. of 30% caustic and 100 cc. of water and air is blown through the charge at 65° C. until the leuco dyestuff has all been oxidized. Ten (10) grams of salt are added and the dye is filtered and dried at 65° C. The product exhausts well from sodium sulfide vats, giving bright blue dyeings on textiles. Due to its good solubility in the vat it gives excellent results when used in package dyeing machines.

*Example 3*

A flask is charged with 148 grams of 32% sodium sulfide crystals, 118 grams of sulfur and 200 cc. of "Cellosolve." The charge is stirred and refluxed for 20 minutes and then cooled to 80° C. There are then added 40.8 grams of diphenylamine leucoindophenol and 7.2 grams of 4-sulfodiphenylamine leucoindophenol as approximately 25% aqueous press cakes. After stirring and refluxing the charge at 106°–108° C. for 24 hours, it is cooled to 80° C. After addition of 70 cc. of 30% caustic the charge is diluted with two volumes of water. Air is blown through the charge at 65° C. until all the leuco dyestuff has been oxidized. Then 20 grams of salt (NaCl) are added to the charge and the product is filtered and dried at 60° C. The dyestuff when used in package dyeing machines yields clean, uniform, bright blue dyeings on cotton.

While "Cellosolve" is the preferred solvent for these thionations any of the usual solvents used in sulfur color thionations give similar results. Water, water-soluble solvents from the group consisting of mono- and polyhydroxy alcohols and their ethers (for instance, ethyl alcohol, isopropyl alcohol and diethylene glycol) or mixtures of these solvents can be used.

In place of the leucoindophenols the unreduced indophenols can be used with similar results.

Other alkali metal polysulfides can be substituted for sodium polysulfide.

I claim:
1. The new sulfur color which dyes textiles in bright blue shades, characterized by excellent solubility and exhausting properties, obtained by thionation by means of alkali metal polysulfides of a mixture of indophenols consisting of from 15% to 50% of a member of the group consisting of indophenol and leucoindophenols from 4-sulfodiphenylamine and from 85% to 50% of a member of the group consisting of the indophenol and leucoindophenol from diphenylamine, in a thionation solvent at reflux temperature and oxidizing the resulting leuco dyestuff.

2. In the process for preparing a sulfur color having in the reduced form excellent solubility and exhausting properties, the step which comprises cothionating an indophenol mixture consisting of from 15% to 50% of a member of the group consisting of indophenol and leucoindophenol from 4-sulfodiphenylamine and from 85% to 50% of a member of the group consisting of indophenol and leucoindophenol from diphenylamine with an alkali metal polysulfide.

3. In the process for preparing a sulfur color having in the reduced form excellent solubility and exhausting properties, the step which comprises cothionating an indophenol mixture consisting of from 15% to 50% of a member of the group consisting of indophenol and leucoindophenol from 4-sulfodiphenylamine and from 85% to 50% of a member of the group consisting of indophenol and leucoindophenol from diphenylamine in ethylene glycol monoethyl ether with an alkali metal polysulfide at reflux temperature.

4. In the process for preparing a sulfur color having in the reduced form excellent solubility and exhausting properties, the step which comprises cothionating an indophenol mixture consisting of from 15% to 50% of a member of the group consisting of indophenol and leucoindophenol from 4-sulfodiphenylamine and from 85% to 50% of a member of the group consisting of indophenol and leucoindophenol from diphenylamine in a thionation solvent with an alkali metal polysulfide at reflux temperature.

References Cited in the file of this patent

UNITED STATES PATENTS

| Number | Name | Date |
| --- | --- | --- |
| 1,083,489 | Hahnenkamm | Jan. 6, 1914 |
| 1,777,757 | Manss | Oct. 7, 1930 |
| 1,944,250 | Lubs et al. | Jan. 23, 1934 |
| 2,165,493 | Lubs et al. | July 11, 1939 |
| 2,202,040 | Zerweck et al. | May 28, 1940 |

FOREIGN PATENTS

| Number | Country | Date |
| --- | --- | --- |
| 7,025 | Great Britain | of 1903 |
| 330,308 | Great Britain | of 1930 |
| 467,920 | Great Britain | of 1937 |